Patent 2,968,524

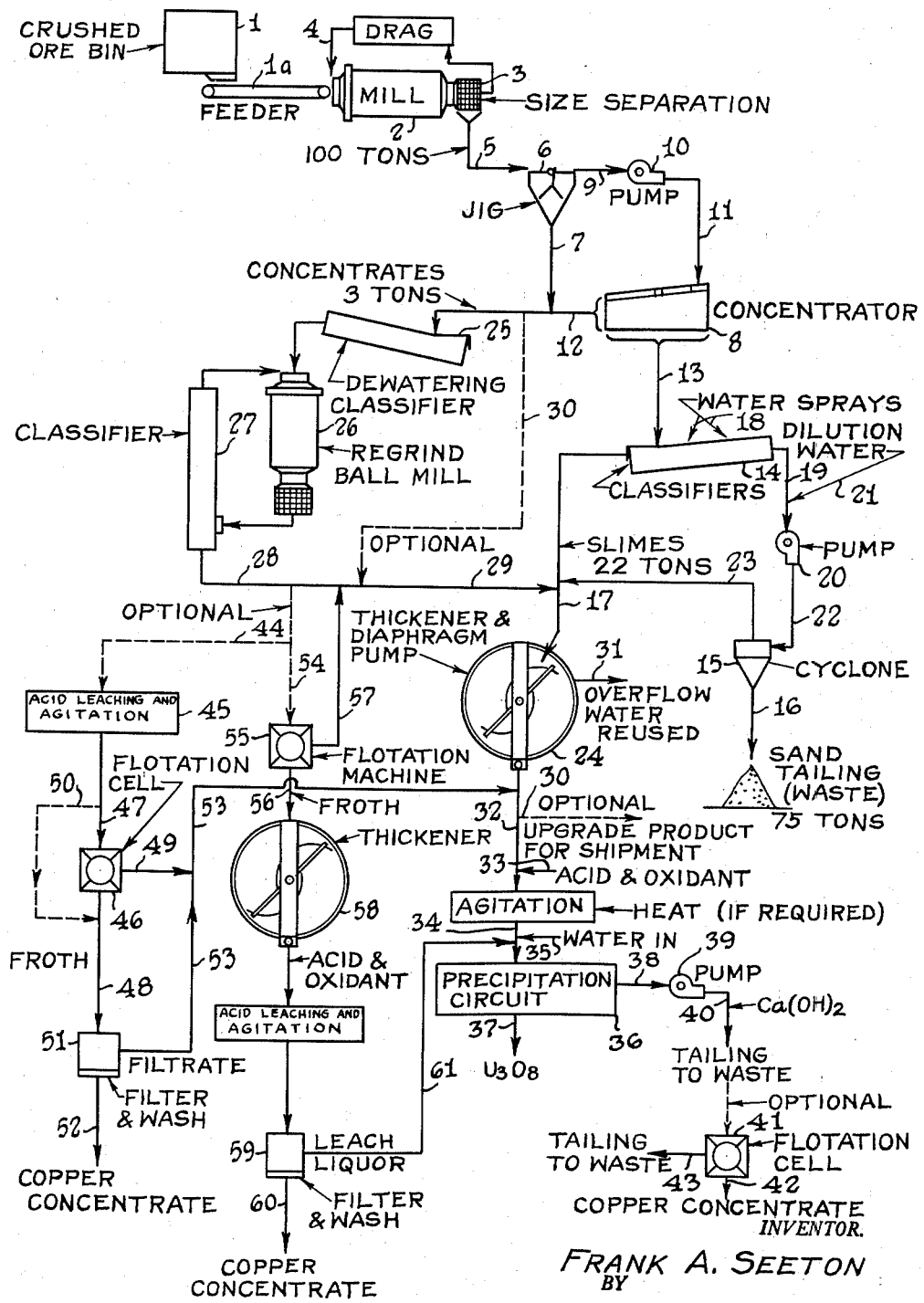

2,968,524

TREATMENT OF URANIUM ORE OF THE SHINARUMP TYPE

Frank A. Seeton, Denver, Colo., assignor to Cog Minerals Corporation, Denver, Colo., a corporation of Delaware Filed Oct. 1, 1956, Ser. No. 613,185

5 Claims. (Cl. 23—14.5)

This invention relates to the treatment of uranium ores, and particularly the ores of the Shinarump type, such as those that occur in the White Canyon area, San Juan County, Utah.

Such ores contain primary uranium minerals such as pitchblende and uraninite together with some sulfides of copper and iron. A typical assay of what is classed as high grade ore would contain approximately 0.50 percent $U_3O_8$ and 1.25 percent Cu, while a low grade ore will have a $U_3O_8$ content approximating 0.05 percent and 0.3 percent copper. The bulk of the weight of the ore comprises sand grains from which the metallic content may be liberated by rubbing or attrition.

The present practice of treating such ores involves an initial size reduction followed by acid leaching, inclusive of heating, and precipitation of the dissolved uranium. The entire ore charge is introduced into the leaching stage, where it has to be agitated and usually is heated and then the entire tonnage is deslimed in acid-resistant classifiers. Such an operation requires a large heat input to effect the necessary heat exchange, and large quantities of acid are required to obtain the necessary extraction. All of these conditions result in the utilization of a relatively large sized, expensive operation for the amount of product obtained, and consequently only ore of about 0.20 percent $U_3O_8$ and over can be treated economically.

The present invention is based on the discovery that the size and specific gravity characteristics of the ore constituents permit utilization of gravity separation methods for elimination of substantially the entire sands content as a waste product before the metallic content is subjected to leaching. As a consequence, it is possible to direct the heat input and the leaching to about 25 percent of the weight of the ore taken for treatment. When acid leaching is employed the desliming can be performed in ordinary equipment since no acid is required at the desliming stage. Another advantage of this treatment is that copper may be recovered as a separate market product.

Accordingly, it is an object of my invention to provide a simple, efficient and economical process for the recovery of the valuable constituents of uranium ores, particularly ores of the White Canyon type. Another object of this invention its to provide a simple and efficient treatment of White Canyon type uranium ores by which the metallic content may be extracted or separated at low cost.

A further object of this invention is to provide a simple, efficient and economical process for the extraction of the uranium content of White Canyon ores by acid leaching in an operation in which substantially the entire waste content of the ore is eliminated before the leaching stage of the treatment.

The practice of the invention will be best understood by reference to the accompanying flow sheet drawing illustrating a typical circuit for utilizing of the novel features of my development. In order to demonstrate the results of test operations, the quantitative relations in the circuit also will be described.

As shown, a White Canyon type ore, after coarse crushing is fed onto a grizzly with the oversize going to a jaw crusher and the fines of the grizzly separation being combined with the jaw crusher product to constitute the supply of a fine ore bin 1. A charge of 100 tons of fine ore is delivered by a feeder 1a to a grinding mill 2, preferably a rod mill, where it is pulped with water and reduced to substantially sand grain size or about —20 mesh and then subjected to a size separation such as in a trommel or vibrating screen 3 with the screen oversize or drag being returned by line 4 for further grinding and the undersize in line 5 constituting the feed to the following separation stage.

The procedure thus far described is directed to freeing the metallic content from the associated sands and may be performed as a wet or dry operation, but preferably is wet for convenience in handling, and involves attrition or rubbing. The grinding may be performed in a rod mill, ball mill or hammer mill. The grinding action preferably provides a rubbing of surfaces in addition to the attrition effect. After grinding the mill discharge is sized with the oversize returning for additional grinding, while the undersize may be subjected to additional sizing before being passed on to a gravity separation stage.

The gravity separation preferably includes jigging in jig 6 to produce a coarse concentrate in line 7 and a second gravity separation is conducted on the jig overflow passing by line 9, pump 10 and line 11 to a gravity concentrator such as a spiral concentrator or a concentrating table 8 to recover the finer size heavy minerals. The coarse and fine heavy mineral concentrates in line 12, which are of specific gravity greater than the sands, collectively represent about 3 percent of the original charge of the treatment and contain roughly half of the total uranium and half of the total copper contained in the initial feed.

The gravity concentration tailing in line 13 is composed of lower specific gravity sands and slimes. The sand component is of low uranium content and can be discarded as waste representing about 75 percent of the initial feed. The slime component amounts to about 22 percent of the original ore charge and represents an enrichment of the uranium. Approximately 40–50 percent of the total uranium is contained in this product and also about the same proportion of copper. It is, therefore, essential that the sand and slime be separated. Thus the gravity tailing in line 13 is deslimed by means of conventional spiral or rake type classifiers 14 of non-acid-resistant construction and cyclone classifiers 15. Water is sprayed into the classifiers 14 by lines 18 and the classifier sand is carried by line 19 to pump 20 with addition of dilution water to the sand being through line 21. The pump discharge is taken by line 22 to cyclone 15 and the slime fraction from cyclone 15 or the cyclone overflow passes through line 23 to combine with the slime in line 17 obtained from classifiers 14. The combined slimes in line 17 are passed on to thickener 24. The sand is discarded from cyclone 15 as waste through line 16.

The coarse concentrate of the jigging separation and the fine concentrate may be subjected to further grinding or size reduction to an optimum size for leaching, as represented by the regrind ball mill circuit shown in the flow sheet. As shown in the drawing this circuit contains in sequence dewatering classifier 25, regrind ball mill 26 and classifier 27 operating in closed circuit with ball mill 26. The classifier overflow passes by lines 28 and 29 to line 17 for transfer to thickener 24. Inasmuch as such size will vary with different ores, an initial determination should be made to determine the optimum size. In this way fine grinding is confined to the valuable constituents and expensive grinding is not expended on silica sand particles. Rather than send the total gravity concentrate in line 12 to the regrind ball mill circuit, it can pass through lines 30, 29 and 17 to thickener 24. Thus the concentrates amounting to approximately 3 percent of the weight of the ore taken for treatment are combined with the slimes passing to the thickener. The underflow of the thickener constitutes the feed to a following acid leaching and precipitation circuit or alternatively can be taken by line 30 as an upgraded product for shipment. Overflow water is taken from thickener 24 by line 31.

In another embodiment of this invention the desliming step can be performed immediately following the grinding circuit, for instance the product from line 5 can be deslimed. In this case the resulting deslimed sand fraction must be subjected to gravity concentration prior to discarding. Then the heavy mineral concentrate and the slimes are passed to the thickener as in the flow sheet. The principle of the process is the same regardless whether the slimes are separated before or after gravity concentration. In recovering the uranium and copper values from the underflow from thickener 24 this material is combined in line 32 with acid and oxidant entering by way of line 33. The mixture is agitated with heating, if required, combined in line 34 with water from line 35, and passed to a conventional precipitation circuit 36 with $U_3O_8$ being taken as product in line 37. The copper-bearing material from the precipitation circuit is passed by line 38 to pump 39 and then to line 40 where it is combined with $Ca(OH)_2$. The resulting material can be sent to waste or a copper concentrate prepared therefrom by treatment in flotation cell 41. In copper recovery the material of line 40 is separated into a flotation concentrate in line 42 and tailings in line 43 which are carried to waste. Thus if desired, the tailings of the precipitation circuit line 38 may be pulped and conducted to one or more flotation cells 41 for recovery of the copper content but before the tailings are passed to waste. Therefore, when the copper content of the ore is sufficiently high the aforesaid flotation concentrations will effect recovery of the copper content and thereby provide a greater overall return from the operation.

Two optional procedures for copper recovery are indicated by the dash line flows leading from line 28. In the first such circuit the gravity concentrate is introduced by line 44 into an acid leaching stage 45 where it is subjected to heating and agitation for dissolution of the uranium. Following this the discharge from the acid leaching-agitation stage 45 is fed by line 47 to froth flotation cells 46 where suitable collecting and frothing reagents are employed to recover in the froth the sulfides of copper in line 48 which are not dissolved by the acid leach liquor subsequently passing from flotation cells 46 through line 49. The flotation cells 46 can be by-passed by sending the discharge from the acid leaching-agitation stage 45 to line 48 through line 50. The material in line 48 is filtered and washed at 51 with the copper concentrate being taken by line 52. The filtrate is passed by line 53 to the underflow from thickener 24. Following removal of the copper concentrate the residual pulp or tailings in line 49 are also conducted by line 53 to the agitation and precipitation circuit in which the slimes are treated.

The flow sheet shows another optional procedure which also may be utilized for uranium and copper recovery. The coarse and fine concentrates in line 12 preferably after regrinding are passed by line 54 into flotation cells 55 for recovery of the copper as a froth concentrate in line 56. The flotation tailings in line 57 are passed in line 29 directly into the head end of the slimes circuit which are treated as previously described. Some of the uranium will be carried into the froth concentrate which is passed into a thickener 58 and then to an acid leaching stage inclusive of agitation with heat and solvent addition to dissolve the uranium. The solids are then filtered and washed at 59 with the copper then being discharged as a clean concentrate in line 60 while the leach liquor removed at the filtration stage in line 61 is conducted to the precipitation circuit of the slimes circuit.

In summary it will be appreciated that by combining the coarse and fine concentrates of line 12 with the slimes passing through the desliming classifiers 14 and cyclone 15 the mixture will contain substantially all of the uranium and copper content. The wasting of the sand tailing in line 16 will have eliminated substantially all barren sands leaving a substantially upgraded product containing the gravity concentrates of line 12 and the slimes which may be taken as the final product of the treatment if desired. Where this is done the regrind ball mill circuit may be eliminated to reduce processing costs and the product can stand a substantial shipping cost and still be valuable enough for treatment in other plants.

It is the intention of the present invention to utilize conventional methods in the acid leaching and precipitation stages, for which reason detailed description of such operations appears unnecessary. Similarly the practice of flotation of copper sulfides is so well known and widely practiced that conventional methods will be employed at these stages.

Where spiral concentrators are employed for gravity separation improved results will be obtained if the concentrate material is fed to a table concentrator to get a final cleaning, and the cleaner table tailings may be recycled as part of the feed to the spiral or may be reground prior to recycling.

It is within the contemplation of my invention to utilize either alkaline or acid leaching operations in the final uranium separation and recovery. The plants of this type now in commercial use utilize a substantial heat input and consequently where my invention is utilized a distinct advantage will be gained in the heat exchange action due to the elimination of the waste sands.

From the foregoing description, it will be apparent that the use of the present invention effectively eliminates a major portion, usually approximating 75 percent, of the weight of the ore taken for treatment before it is passed into the leaching stage. This upgrading permits use of a small leaching plant with less acid consumption, and greatly reduces the heat input requirement of the leaching stage and the horsepower requirement of the agitation. Likewise, the instant operation provides optimum extraction in shorter contact time and the plant is subjected to less wear because of the smaller quantity of material handled. All these factors result in an economical treatment of low grade ores.

I claim:

1. In a process of treating ores of the Shinarump type which contain uranium and copper, the steps comprising grinding the ore to substantially sand grain size, desliming uranium and copper-containing slimes from the ground ore, gravity separating from the ground ore a heavy mineral concentrate containing uranium and copper, said gravity separation and desliming providing sands of uranium and copper content substantially less than the ore, said heavy mineral concentrate and slimes being enriched in uranium and copper, leaching said slimes to recover uranium values, recovering copper values from said heavy mineral concentrate while dissolving contained uranium values, and passing the dissolved uranium values to said leaching step to effect their recovery.

2. The method of claim 1 in which copper is recovered from the tailing of said leaching step.

3. The method of claim 1 in which the gravity separation precedes the desliming.

4. In a process of treating ores of the Shinarump type which contain uranium and copper, the steps comprising grinding the ore to substantially sand grain size, gravity separating from the ground ore a heavy mineral concentrate containing uranium and copper while obtaining sands mixed with uranium and copper-containing materials, desliming the mixed sands-uranium and copper-containing materials to obtain slimes and sands of uranium and copper content substantially less than that of the ore, said heavy mineral concentrate and slimes being enriched in uranium and copper, leaching said slimes to recover uranium values, recovering copper values from said heavy mineral concentrate while dissolving contained uranium values, and passing the dissolved uranium values to said leaching step to effect their recovery.

5. The method of claim 4 in which copper is recovered from the tailing of said leaching step.

References Cited in the file of this patent

UNITED STATES PATENTS

| | | |
|---|---|---|
| 1,195,698 | McCoy | Aug. 22, 1916 |
| 2,173,523 | Nye et al. | Sept. 19, 1939 |
| 2,175,484 | Rees et al. | Oct. 10, 1939 |
| 2,562,024 | Dunn et al. | July 24, 1951 |

OTHER REFERENCES

Davis: U.S. Bureau of Mines R.I. 3370, pages 1–7, 92–96, February 1938. (Copy in Scientific Library, TN 1.U8.)

Ehrlinger et al.: AEC, Document AEC D–3725, Dec. 1, 1953. (Copy available from Office of Technical Services, Dept. of Commerce, Washington 25, D.C.)

Engel et al.: U.S. Bureau of Mines R.I. 3628, pages 16–21, March 1942. (Copy in Scientific Library.)

AEC Document RMO–2805 June 30, 1955, pages 5–7, 12–15, 17, 31–36. (Copy in Scientific Library.)

AEC Document MITG–263 Jan. 17, 1951 (date declassified Jan. 11, 1956), pages 9 and 10. (Copy in Scientific Library.)

AEC Document RMO–2801, Sept. 10, 1954, pages 6, 7, 40–50. (Copy in Scientific Library.)

AEC Document MITG–263, Jan. 17, 1951 (date declassified Jan. 11, 1956), pp. 11–17. (Copy in Scientific Library.)